March 29, 1949.  J. R. L. ERICKSON  2,465,975
IRRIGATION FLOW REGULATOR APPARATUS
Filed Sept. 13, 1947  2 Sheets-Sheet 1
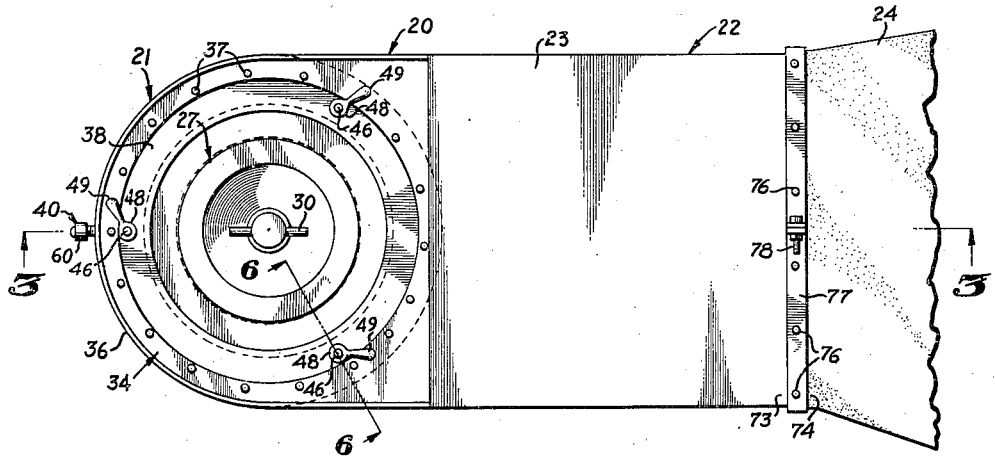
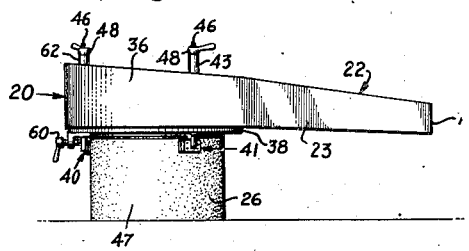
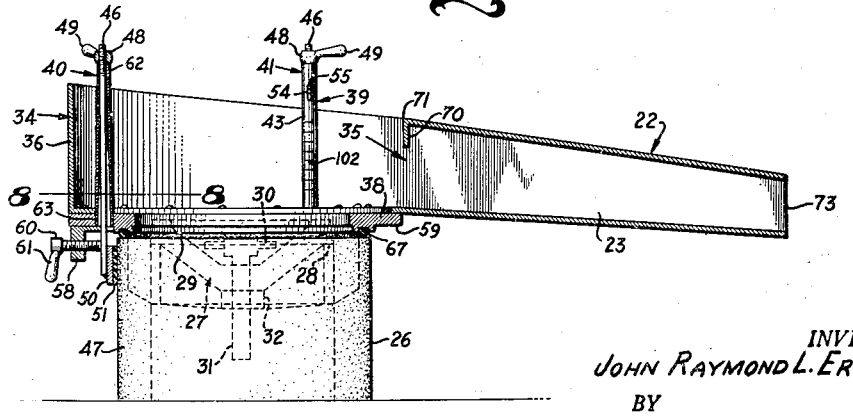
INVENTOR:
JOHN RAYMOND L. ERICKSON.
BY
Huebner, Maltby & Beehler
ATTORNEYS.

March 29, 1949. J. R. L. ERICKSON 2,465,975
IRRIGATION FLOW REGULATOR APPARATUS
Filed Sept. 13, 1947 2 Sheets-Sheet 2
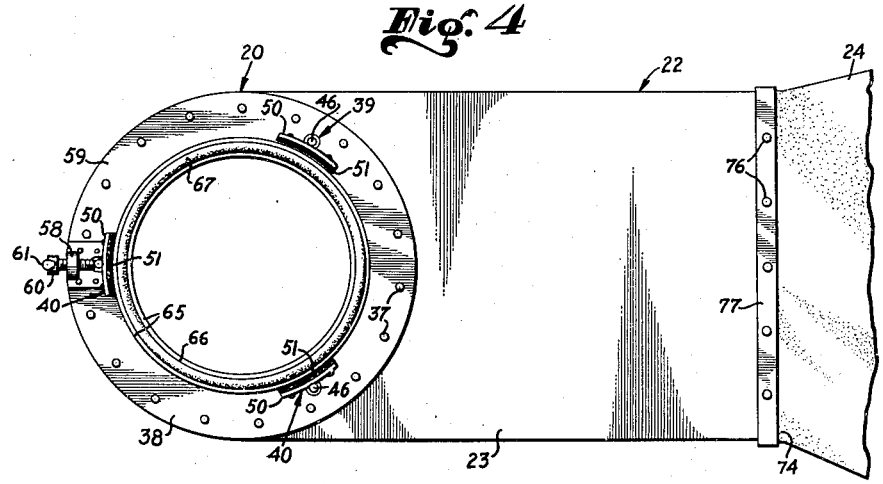
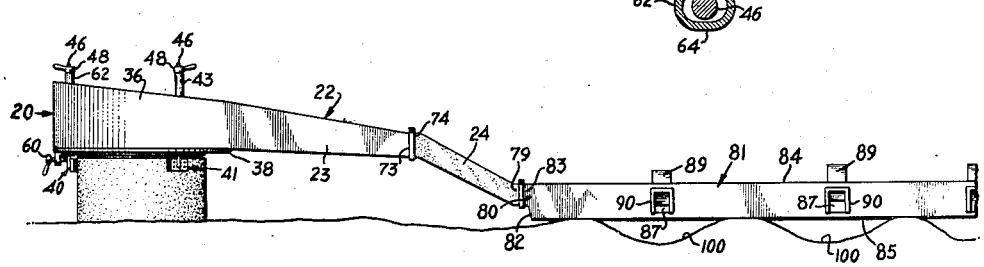
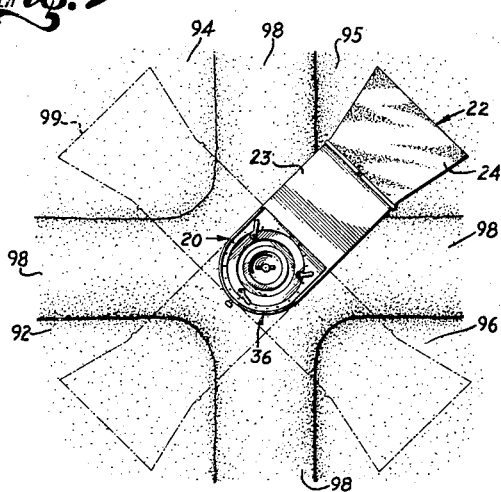
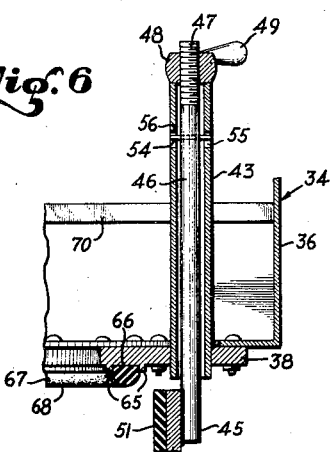
INVENTOR:
JOHN RAYMOND L. ERICKSON.
BY
Huebner, Malthy & Beehler
ATTORNEYS.

Patented Mar. 29, 1949

2,465,975

UNITED STATES PATENT OFFICE 2,465,975

IRRIGATION FLOW REGULATOR APPARATUS

John Raymond L. Erickson, Kerman, Calif.

Application September 13, 1947, Serial No. 773,877

16 Claims. (Cl. 61—12)

1

This invention relates to irrigation flow regulator apparatus and more particularly to a new and improved housing and securement therefor associated with conduit means designed to direct and regulate the flow of water from a stand-pipe in any desired direction and to any desired extent.

Ordinarily in the irrigation of alfalfa and other similar crops requiring flooding, standpipes are permitted to overflow, creating an eroded ponded area thereabout sometimes extending for a distance of several feet in either direction. The water entrant upon said area usually issues with considerable force, at least sufficient not only to under-cut the soil, but also to wash away any vegetation or seed which may have been planted or growing around the standpipe. Even during the course of irrigation of trees and the like crops in which channels are formed and flumes provided for appropriate irrigation, the use of a standpipe generally results in a flooded area through which an operator must wade in order to regulate the flow and in any event there is frequently no adequate means provided for directing a desired flow in any intended direction.

Sometimes weirs are provided on a standpipe but these lack directional adjustability to the extent desired. In any event, many standpipes have already been installed lacking a weir construction of any nature and some means of flow regulation must be provided if the intended control is to be achieved.

The alternative construction is the utilization of dikes, generally of earth, by virtue of which the water is conducted usually temporarily in one or another direction. This alternative, however, is time consuming and wasteful, both of the land area involved and of the water which may be rapidly absorbed in the ponding area wastefully and unnecessarily.

It is therefore an object of this invention to provide a simple, efficient, readily transportable, and replaceable standpipe flow regulator incorporating, if desired, appropriate flume elements, either of a rigid or flexible construction or any combination of these, and which may be optionally provided with an appropriate distributor mechanism having selective means at various portions thereof for directing a low-level flow of irrigation water into any desired checks or furrows.

It is another object of the present invention to provide a new and improved means for the selective directing of irrigation water from a standpipe or the like in any direction and which may be secured to any of a number of standpipes even though their diameters vary to some extent.

Another object of this invention is to provide a mechanism for controlling the flow of irrigation water from a standpipe and directing the same without waste directly to a point remote from the standpipe where first use thereof is intended.

Another object of this invention is a provision of a new and improved adaptable and flexible conduit means for standpipes.

Another further object of the invention is the provision of a universally adaptable standpipe flow regulator which may be radially secured to standpipes of any predetermined external diameter, including substantial variance from said diameter and without the use of tools.

Another further object is the provision of a new and improved standpipe flow regulator of the desired character described, associated with new and improved clamping means for securing the same to the top of the standpipe.

Still another object is the provision of a new and improved sealing means utilizable between the flow regulator for a standpipe and the upper lip of the standpipe to prevent waste of water normally escaping therebetween.

This invention, moreover, has for an object the improvement of prior art apparatus and equipment heretofore employed for obtaining a similar result.

Still other objects and purposes of this invention will become apparent from the drawings and the specifications relative thereto.

In the drawings:

Fig. 1 is a plan view of a preferred form of flow regulator selected for illustrating this invention.

Fig. 2 is an elevational view thereof.

Fig. 3 is a sectional view taken as on a line 3—3 of Fig. 1.

Fig. 4 is a bottom view of the regulator.

Fig. 5 is a side view of the flow regualtor including distribution means.

Fig. 6 is a vertical elevational view taken as on a line 6—6 of Fig. 1.

Fig. 7 is a view of the regulator as applied to a standpipe, illustrating a few alternative positions thereof.

Fig. 8 is a section on the line 8—8 of Fig. 3.

Referring more particularly to the drawngs:

A flow regulator therein generally designated by the numeral 20 perferably comprises a housing portion generally designated by the numeral 21 and a conduit portion 22, including, if desired, a rigid portion 23 and a flexible portion 24, as illustrated in the preferred embodiments of Figs. 1 through 4, 6 and 7.

The housing 21 is designed to fit over the top of a conventional standpipe 26 having a usual valve element 27 therein normally closing against a seat 28 within or adjacent its brim 29. The valve 27 may be operated as by means of a customary handle 30 as through and by means of a stem 31 threadedly secured in a spider 32 or the like.

The housing 21 may be formed with an accumulator 34 comprising a preferably curved vertical wall defining an opening or gate 35 on one side thereof. The accumulator further preferably comprises an annulus or reinforcing rim 36 which may be secured as by means of rivets 37 to the turned in or separately formed bottom 38 of the accumulator.

Any number of dogs, such as three, designated at 39, 40, and 41 may be provided. Of these, dogs 39 and 41 each may include a tubular member 43 welded, threaded or otherwise firmly secured in the annular member 38 in a manner that when the regulator is properly disposed upon a standpipe the lower ends 45 of rods 46, each of which is slidably disposed within a corresponding tubular member, are positionable against an adjacent part of the outer wall 47 of the standpipe. For extension thereof, the rods 46 may each be provided with threads 47 or other appropriate means cooperable as with nuts 48 designed to bear against the tubular members and each having a handle 49 thereon.

At their lower ends 45 the rods may be equipped as with a curved plate 50 substantially conformable to and adapted to nest against said outer face of the standpipe. The plates 50 may be secured by any well-known means, as by welding, to the rod 46 and are faced with any appropriate gripping surface 51 such as sheet rubber, automobile brake lining, or like stuff.

Said dogs 39 and 41 may be further provided as with a pin 54 extending radially therethrough, preferably firmly secured in or to the rod 46 and projecting radially outwardly to be accommodated in one or more slots 55 and 56 extending longitudinally of the tube 43 as in opposite side walls thereof, thereby permitting relative axial movement of the rods 46 within their corresponding tubes upon the rotation of their nuts 48 as stated.

A bracket 58 may be welded or otherwise secured to the lower face 59 of the annulus 38 and may be fitted with a clamping bolt 60 extensible radially with respect to the flow regulator and optionally equipped with a handle 61 or turnable by a wrench.

The dog 40 differs from the dogs 39 and 41, only in that the tube 62 thereof may be flared to provide relative radial movement of its rod 46. To this end, the tube 62 may be substantially elliptical in cross-section, as illustrated most clearly in Fig. 8, particularly at its lower end 63, and may even incorporate confronting flat sides 64 for freeing said rod 46 for limited radial pivotal or flexing movement.

On its bottom side the annulus 38 may be formed with shoulders 65 defining an annular recess 66 within which a suitable gasket 67, preferably formed of rubber or other deformable material, may be confined. The gasket 67 is intended to seat firmly and sealably upon the upper edge 29 of the standpipe and should therefore have a substantial portion 68 projecting below the lowest portion of the annulus 38.

The conduit 22 may open freely into the accumulator as by means of the gate 35 at its point of junction with the rigid conduit member 23, which latter may be formed with a turned down flanged portion 70 to provide rigidity to its upper edge 71. Said rigid conduit member may also taper towards its distal end 73 to fit into a complementary end 74 of the flexible portion 24 of the conduit. This may be formed of canvas, rubber, or similar deformable material secured as by rivets 76 within a metal band 77 designed for firm securement around the end 73 of the rigid metallic conduit 22 as by means of a pinch bolt 78.

The opposite end 79 of the flexible conduit 24 may be similarly secured to the restricted end portion 80 of a preferably elongated distributor box 81 into which water may flow through an offset portion 82 defining an opening 83 into said distributor box.

The box or flume 81 may be of rectangular cross-section comprising a top portion 84, a bottom 85, and side walls 86. Suitably spaced ports 87 may be formed in the side walls 86 and are preferably equipped with adjustable weirs 89 which may be slideable, for example in side channels 90 in well known manner. Also, if desired, the ports 87 may be disposed at progressively lower elevations proceeding from the opening 83 toward a terminal end (not shown) in order that the decreased flow of water toward said terminal end due to its gradual escape from the lateral ports 87 will not unduly rob the ports toward the terminal end. This construction is not essential, however, inasmuch as the flow may be regulated in any equally appropriate manner as by a proper positioning of the optional weirs 89.

*Operation*

In use, a standpipe 26 having a circular rim 29 and valve elements adapted to normally close the standpipe in a conventional manner as heretofore described may be fitted with a flow regulator by backing off the bolt 60 to an extent necessary to permit the gripping faces 51 on all three of the dogs 39, 40, and 41 to be applied to the outer surface 47 of the standpipe.

The gasket or sealing member 67 may be next pressed into contiguity with the upper face 29 of the standpipe whereupon the bolt 60 may be rotated in a clockwise direction by means of the handle 61 to clamp the gripping faces 51 firmly against the outer face 47 of said standpipe. Thereupon the dogs 39, 40, and 41 may be tightened by similar clockwise rotation of their handles 49 in a manner to draw the rods 46 into their corresponding tubes. The abutment of the nuts 48 will thereby forcibly draw the accumulator housing down upon the rim of the standpipe, causing the same to have a watertight engagement therewith by virtue of the sealing member 67.

Manifestly any number of dogs may be used, but by utilizing three as shown it is possible to permit two, such as 39 and 41, to remain rigidly secured to the accumulator housing as at the annulus 38, while the rod 46 associated with the dog 40 may be alone tightened as against the standpipe by means of the bolt 60.

Thus, means have been provided to clamp the accumulator firmly upon the brim of the standpipe and supplementally to draw the same tightly downwardly and over said brim in order to seat the same firmly thereon and, by means of said seal member, in a watertight manner.

Thus, when a standpipe is positioned between alfalfa checks 94, 95, 96, and 97, as defined for example by dikes 98, the conduits 22 may be selectively disposed in any one of the checks. Thus, if the apparatus is clamped upon the standpipe in a manner to direct the flow into a first check 95, reorientation thereof to direct the flow into a second check as 94, as shown in dotted outline identified by numeral 99, may be accomplished by loosening the bolt 60 and swinging the entire apparatus revolved to said second position. Thereupon, the bolt 60 and the dogs may be consecutively tightened in order to seat the apparatus again firmly upon the standpipe.

Depending upon the amount of necessary adjustment in the dogs for causing them to bring about a firm seat between the sealing elements 67 and top of the standpipe, they need or need not be loosened so as to extend downwardly to their utmost length prior to each successive adjustment. Thus, in some instances, where slight adjustment to bring about a satisfactory seal is all that is required, only a slight rotation of the handles 49 will be necessary so that the dogs need not be positioned in their original fully extended manner before each application of the apparatus.

Where irrigation is undertaken as by the use of furrows 100, the distributor 81 may be used. The ports 87 may be opened to any desired extent for flooding any furrow in the manner desired and any of the ports may be totally closed or only partially opened in order to achieve a satisfactory irrigation in each of the furrows, or any of them, as may be desired. Moreover, the flow emanate at low level and undesired washing and under-cutting of the soil consequent on conventional standpipe irrigation methods is avoided.

Frequently it will be found that the amount of water emanating from the standpipe can be set at a desired rate of flow to achieve a suitable amount of irrigation by gauging the depth of the water emanating therefrom, and for this purpose if desired an appropriate scale 102 may be provided on the exterior faces of any one of the tubes 43.

This invention features a flow regulator intended for transportation, if desired, from one standpipe to another and satisfactory to alter the direction of flow from said standpipe as well as conduct said flow to a desired point of use without waste and without flooding the immediate vicinity.

Inasmuch as standpipes are frequently made of cementitious material containing a large amount of pores and a substantially rough surface, it is desirable that the sealing element 67 be adapted to conform to such irregularities to a substantial extent and for this purpose it is desirable that sufficient body be given to the sealing member that it properly perform its sealing function. The balance of the apparatus may be made of metal, including the weirs 89, while the flexible portions 24 thereof may, as stated, be composed of canvas, rubber or the like.

Although I have herein shown and described my invention in what I have conceived to be the most practical and preferred embodiment, it is recognized that departures may be made therefrom within the scope of my invention, which is not to be limited to the details disclosed herein, but is to be accorded the full scope of the claims so as to embrace any and all equivalent devices.

Having described my invention, what I claim as new and desire to secure by Letters Patent is:

1. A flow regulator adapted to fit upon the top of a standpipe for regulating a flow of water therefrom comprising a housing, radial selective clamping means for selectively securing the housing to the standpipe, sealing means upon the housing normally disposable between the housing and the rim of the standpipe, and vertical clamping means associated with said radial clamping means for achieving a watertight contiguity between said rim and said housing by virtue of said sealing means.

2. A flow regulator adapted to fit upon the top of a standpipe for regulating a flow of water therefrom comprising housing, radial selective clamping means for selectively securing the housing to the standpipe, sealing means upon the housing normally disposable between the housing and the rim of the standpipe, said housing comprising an accumulator substantially encircling the end of the standpipe and defining a sluice-gate upon one side thereof, and distributor means extending from said sluice-gate.

3. A flow regulator adapted to fit upon the top of a standpipe for regulating a flow of water therefrom comprising housing, radial selective clamping means for selectively securing the housing to the standpipe, sealing means upon the housing normally disposable between the housing and the rim of the standpipe, said housing comprising an accumulator substantially encircling the end of the standpipe and defining a sluice-gate upon one side thereof, and distributor means extending from said sluice-gate, said distributor means comprising a conduit, and a movable distribution box receiving from said conduit.

4. A flow regulator adapted to fit upon the top of a standpipe for regulating a flow of water therefrom comprising housing, radial selective clamping means for selectively securing the housing to the standpipe, sealing means upon the housing normally disposable between the housing and the rim of the standpipe, said housing comprising an accumulator substantially encircling the end of the standpipe and defining a sluice-gate upon one side thereof, and distributor means extending from said sluice-gate, said distributor means comprising a conduit, and a movable distribution box receiving from said conduit, said distribution box comprising an elongated collector having any number of lateral parts formed therein, and individually adjustable weirs disposable over and for controlling a flow from said parts to any desired extent.

5. A flow regulator adapted to fit upon the top of a standpipe for regulating a flow of water therefrom comprising housing, radial selective clamping means for selectively securing the housing to the standpipe, sealing means upon the housing normally disposable between the housing and the rim of the standpipe, said housing comprising an accumulator substantially encircling the end of the standpipe and defining a sluice-gate upon one side thereof, and distributor means extending from said sluice-gate, said distributor means comprising a conduit, and a movable distribution box receiving from said conduit, said distribution box comprising an elongated collector having any number of lateral parts formed therein, and individually adjustable weirs disposable over and for controlling a flow from said parts to any desired extent, said conduit including a flexible section therein designed to permit relative adjustment of said housing and said box.

6. A flow regulator adapted to fit upon the top of a standpipe for regulating a flow of water therefrom comprising housing, radial selective clamping means for selectively securing the housing to the standpipe, sealing means upon the housing normally disposable between the housing and the rim of the standpipe, and vertical clamping means associated with said radial clamping means for achieving a watertight contiguity between said rim and said housing by virtue of said sealing means, said radial clamping means comprising a plurality of dogs projecting axially below said housing at the sides thereof and at least one of said dogs being movably anchored to one of said annular members and one having radially adjustable means whereby it may be moved radially and adjusted and clamped on standpipes of variant external diameters.

7. A flow regulator adapted to fit upon the top of a standpipe for regulating a flow of water therefrom comprising housing, radial selective clamping means for selectively securing the housing to the standpipe, sealing means upon the housing normally disposable between the housing and the rim of the standpipe, and vertical clamping means associated with said radial clamping means for achieving a watertight contiguity between said rim and said housing by virtue of said sealing means, said radial clamping means comprising a plurality of dogs projecting axially below said housing at the sides thereof and at least one of said dogs being movably anchored to one of said annular members and one having radially adjustable means whereby it may be moved radially and adjusted and clamped on standpipes of variant external diameters, said dogs each comprising a sleevelike member, secured to the housing, a bolt loosely extensible through said member, a gripping element secured to said bolt and manual means for tensioning said bolt axially.

8. A flow regulator adapted to fit upon the top of a standpipe for regulating a flow of water therefrom comprising housing, radial selective clamping means for selectively securing the housing to the standpipe, sealing means upon the housing normally disposable between the housing and the rim of the standpipe, and vertical clamping means associated with said radial clamping means for achieving a watertight contiguity between said rim and said housing by virtue of said sealing means, said radial clamping means comprising a plurality of dogs projecting axially below said housing at the sides thereof and at least one of said dogs being movably anchored to one of said annular members and one having radially adjustable means whereby it may be moved radially and adjusted and clamped on standpipes of variant external diameters, said dogs each comprising a sleevelike member, secured to the housing, a bolt loosely extensible through said member, a gripping element secured to said bolt and manual means for tensioning said bolt axially, at least one of said sleevelike members being elongated in a radial direction cross-sectionally in a manner to permit the bolt therein to be moved radially within said housing, said bolt being engageable by said radial selective clamping means thereby securing the housing to the standpipe, as stated.

9. A flow regulator adapted to fit upon the top of a standpipe for regulating a flow of water therefrom comprising housing, radial selective clamping means for selectively securing the housing to the standpipe, sealing means upon the housing normally disposable between the housing and the rim of the standpipe, and vertical clamping means associated with said radial clamping means for achieving a watertight contiguity between said rim and said housing by virtue of said sealing means, said radial clamping means comprising a bracket depending from and rigidly secured to said housing, an axially extensible bolt threaded into said bracket and handle on said bolt for turning the same.

10. A flow regulator adapted to fit upon the top of a standpipe for regulating a flow of water therefrom comprising housing, radial selective clamping means for selectively securing the housing to the standpipe, sealing means upon the housing normally disposable between the housing and the rim of the standpipe, and vertical clamping means associated with said radial clamping means for achieving a watertight contiguity between said rim and said housing by virtue of said sealing means, said radial clamping means comprising a bracket depending from and rigidly secured to said housing, an axially extensible bolt threaded into said bracket and a handle on said bolt for turning the same, said bolt being in alignment with at least one portion of said vertical clamping means and engageable with the same upon the tightening of said bolt in order to force the same radially inwardly into clamping engagement with the external face of the standpipe.

11. A flow regulator adapted to fit upon the top of a standpipe for regulating a flow of water therefrom comprising housing, radial selective clamping means for selectively securing the housing to the standpipe, sealing means upon the housing normally disposable between the housing and the rim of the standpipe, and vertical clamping means associated with said radial clamping means for achieving a watertight contiguity between said rim and said housing by virtue of said sealing means, said vertical clamping means comprising three dogs including vertically disposed sleeves, rods loosely extensible within said sleeves, plates secured to one end of said rods and provided with gripping surfaces and manual means upon the other end of said rods whereby the same may be forcibly retracted within said sleeves.

12. A flow regulator adapted to fit upon the top of a standpipe for regulating a flow of water therefrom comprising housing, radial selective clamping means for selectively securing the housing to the standpipe, sealing means upon the housing normally disposable between the housing and the rim of the standpipe, and vertical clamping means associated with said radial clamping means for achieving a watertight contiguity between said rim and said housing by virtue of said sealing means, said vertical clamping means comprising three dogs including vertically disposed sleeves, rods loosely extensible within said sleeves, plates secured to one end of said rods and provided with gripping surfaces and manual means upon the other end of said rods whereby the same may be forcibly retracted within said sleeves, and means between the rods and the sleeves restraining relative rotation thereof.

13. A flow regulator adapted to fit upon the top of a standpipe for regulating a flow of water therefrom comprising housing, radial selective clamping means for selectively securing the housing to the standpipe, sealing means upon the housing normally disposable between the housing and the rim of the standpipe, and vertical clamping means associated with said radial clamping means for achieving a watertight contiguity between said rim and said housing by virtue of said sealing means, said housing having an annular groove around a bottom portion thereof, said sealing means comprising an annular gasket disposed within and projecting from said groove and comprising a readily deformable material.

14. In a flow regulator comprising a housing designed for watertight securement upon a standpipe and having radial selective clamping means for selectively securing the housing to the standpipe to any radial direction and sealing means upon the lower surface of the housing normally disposed between the housing and the top edge of the standpipe and conduit means associated with said housing: A vertical clamping means for achieving a substantially watertight connection between the housing and the standpipe comprising a plurality of dogs, said dogs including sleeve portions and rod portions extensible through said sleeve portions, at least one of said sleeve portions being elongated in a radial direction with respect to the center of the housing whereby the corresponding rod may have relative radial movement within said sleeve for permitting the adjustable application of said dogs over and around the top of the standpipe, and means operatively associated with said last named dog for forcibly pressing said dog grippingly against said standpipe.

15. A flow regulator adapted to fit upon the top of a standpipe for regulating a flow of water therefrom comprising housing, radial selective clamping means for selectively securing the housing to the standpipe, sealing means upon the housing normally disposable between the housing and the rim of the standpipe, and vertical clamping means associated with said radial clamping means for achieving a watertight contiguity between said rim and said housing by virtue of said sealing means, a distributor box comprising spaced ports for regulating the flow of water at corresponding spaced points.

16. A flow regulator adapted to fit upon the top of a standpipe for regulating a flow of water therefrom comprising housing, radial selective clamping means for selectively securing the housing to the standpipe, sealing means upon the housing normally disposable between the housing and the rim of the standpipe, and vertical clamping means associated with said radial clamping means for achieving a watertight contiguity between said rim and said housing by virtue of said sealing means, said radial selective clamping means comprising a radially movable threaded clamping element, and a clamping shoe operatively associated with said clamping element designed to be urged centrally by the tightening of said element.

JOHN RAYMOND L. ERICKSON.

No references cited.